United States Patent Office 2,859,268
Patented Nov. 4, 1958

2,859,268

ZINC ELECTRODE FOR PRIMARY BATTERIES

Adolph Fischbach, Elberon, and Achille L. Almerini, West End, N. J., assignors to the United States of America as represented by the Secretary of the Army No Drawing. Application May 4, 1955
Serial No. 506,099

3 Claims. (Cl. 136—126)

(Granted under Title 35, U. S. Code (1952), sec. 266)

The invention described herein may be manufactured and used by or for the Government for governmental purposes without the payment of any royalty thereon.

This invention relates to a method of making porous zinc electrodes for primary batteries particularly special purpose batteries of high capacity per unit of weight and volume, high discharge rates and good operating characteristics at extremely low temperatures.

It has long been known to make porous zinc electrodes by a method comprising the steps of mixing zinc oxide powder with water to form a paste, pasting this mixture into a supporting grid, drying the pasted plates and forming the zinc oxide electrolytically in a suitable forming solution into metallic zinc of a very porous spongy structure. The greatest difficulties encountered in the manufacture of such porous zinc electrodes lies in the fact that the pasted plate on immersion into the forming solution starts to shed zinc oxide under the influence of the electrolytic process that goes on during formation, that is, during reduction of the zinc oxide to metallic zinc. The many proposals that have been made to overcome these difficulties entail various disadvantages such as impairing the electrical characteristics of the zinc electrode itself, complicating the manufacturing process, increasing its costs, etc.

According to U. S. Patent No. 2,640,864 a satisfactory solution has been achieved by heating the pasted plate to high temperatures for a very short time before immersing the electrode into the forming solution. This process is very expedient and overcomes the shedding of the pasted zinc oxide plate on subsequent forming but this procedure, like all previously known methods makes it necessary to submit the spongy zinc electrode, after formation, to a process of rolling or pressing so as to reduce the thickness of the spongy zinc structure before assembling it into a battery.

It has now been found that the subsequent rolling or pressing of porous zinc electrodes made by forming a pasted zinc oxide plate may be completely eliminated by using a solution of a synthetic high polymer such as polystyrene in an anhydrous organic volatile solvent instead of water in the making of the zinc oxide paste. A plate made with such a paste requires not the pre-heating as prescribed according to the process of Patent No. 2,640,864 because the plate pasted according to the present invention does not shed zinc in the subsequent process of formation, nor does the formed porous zinc plate need any rolling or pressing whatsoever.

The invention will become more apparent from the following description of specific embodiments of the broad inventive idea.

The paste is prepared by mixing about 99% of finely ground zinc oxide powder and 1% of polystyrene powder with sufficient benzene to make a workable paste. Instead of benzene, toluene, or other suitable organic volatile solvents may be used. This mixture is now pasted into a supporting grid consisting of gauze, net, or screen made of very thin metal wire such as, copper, bronze, silver, nickel, aluminum or the like. Zinc plated copper or silver plated nickel or other suitable combinations may also be used. The screen wire may be 0.01" or less. Various wire screens such as 16/16 or 45/45 may be used having various wire thickness up to 0.02" and more.

After pasting the zinc oxide-polystyrene-benzene mixture into the supporting grid, the plate is dried either at normal temperature or at elevated temperatures preferably at about 120° F. The dried plate is formed in the usual manner, for instance, in a cell using nickel sheets as anodes and a 5% solution of potassium hydroxide or sodium hydroxide as electrolyte for about 20 hours. No shedding at all occurs during formation and the finished electrode shows sufficient mechanical strength and excellent electrical characteristics without being rolled or pressed to reduce its thickness. This is a decided improvement over the water pasted zinc oxide electrodes which require rolling or pressing after formation.

Instead of polystyrene any other appropriate synthetic high polymer may be used such as, for instance, methyl methacrylate, polyethylene, silicons, etc. In most instances the polymer should not be used in amounts greater than about three-quarters of 1% up to about 1% of the weight of the zinc oxide which is used to make up the paste. In such small amounts the polymer remains in the electrode as dispersed powder without forming a continuous film that would increase the internal resistance of the cell. With less than 1% polymer the electrodes show great physical strength and sufficient permeability to the liquid electrolyte so that a large electrode area is exposed to it when the battery is in use. It should be understood, however, that the limitations of the amount of polymer to about 1% relate only to electrodes of extremely high discharge rates, for example, to rates from 1 to 5 minutes. At lower discharge rates the utilization of the electrodic zinc material may also be very efficient with greater amounts than 1% polymer; even as much as 5% and higher may under certain conditions give efficient porous zinc electrodes.

The porous electrode made according to the present invention may be used as a negative electrode in combination with various electrochemical systems and suitable acid or alkaline electrolytes. It may, for instance, be used with a silver peroxide or mercuric oxide counter electrode and potassium hydroxide as electrolyte; or it may be used with a lead peroxide counter electrode with sulphuric acid or fluorboric acid as electrolyte.

In all these combinations the new porous zinc plate furnishes batteries which show better mechanical and electrical characteristics than all other batteries using zinc electrodes made according to any other process.

It will be obvious to those skilled in the art that many variations and combinations other than those described are feasible within the scope of the invention as defined in the appended claims.

What is claimed is:

1. The method of manufacturing zinc electrodes of very high porosity for primary, special purpose batteries capable of being discharged at extremely high discharge rates comprising mixing finely ground zinc oxide powder with a solution of a high polymer selected from the group consisting of polystyrene, polyethylene, polymethylmethacrylate and silicones in an anhydrous volatile organic solvent to form a paste, pasting said anhydrous paste into a supporting grid, allowing the organic volatile solvent to evaporate and cathodically reducing the dried zinc oxide to metallic zinc by a forming process to obtain a zinc electrode of very high porosity.

2. The method of manufacturing spongy zinc electrodes according to claim 1 in which the zinc oxide powder is mixed with an anhydrous solution of polystyrene in an anhydrous organic solvent consisting of a member of the group of benzene and toluene.

3. The method of manufacturing spongy zinc electrodes according to claim 1 in which said high polymer is used in an amount of not more than 1% of the weight of the zinc oxide.

References Cited in the file of this patent

UNITED STATES PATENTS

| | | |
|---|---|---|
| 2,297,248 | Rudolph | Sept. 29, 1942 |
| 2,501,673 | Glassner | Mar. 28, 1950 |
| 2,561,943 | Moulton et al. | July 24, 1951 |
| 2,572,017 | Ellis | Oct. 23, 1951 |
| 2,649,492 | Linton et al. | Aug. 18, 1953 |
| 2,694,743 | Ruskin et al. | Nov. 16, 1954 |
| 2,708,683 | Eisen | May 17, 1955 |
| 2,738,375 | Schlotter | Mar. 13, 1956 |
| 2,739,179 | Barrett | Mar. 20, 1956 |